May 28, 1935.  L. GREENBERG  2,002,890
MECHANICAL MOVEMENT
Filed July 22, 1932
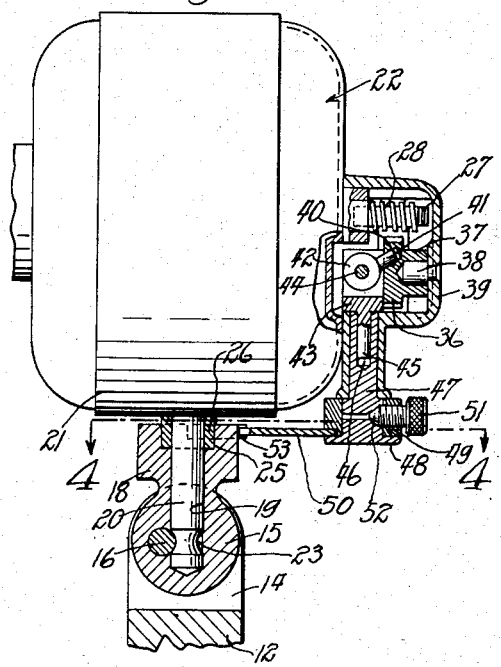

Patented May 28, 1935

2,002,890

UNITED STATES PATENT OFFICE 2,002,890

MECHANICAL MOVEMENT

Louis Greenberg, Chicago, Ill.

Application July 22, 1932, Serial No. 623,992

12 Claims. (Cl. 74—70)

The invention relates to a mechanical movement adapted to produce oscillation, and its principal object comprises the provision of a mechanical movement which is highly efficient, reliable and yet inexpensive in manufacture and operation.

It is also an object of the invention to provide a mechanical movement capable of producing an oscillation of comparatively great amplitude.

With these and other equally important objects in view which will become apparent from a perusal of the invention, the latter comprises the means described in the following specification, particularly pointed out in the claims forming a part thereof, and illustrated in the accompanying drawing, in which:

Fig. 1 is an elevational side view of a fan, in which the novel mechanical movement is incorporated, in accordance with my invention.

Fig. 2 is a section on the line 2—2 of Fig. 1.

Fig. 3 is a section on the line 3—3 of Fig. 2.

Fig. 4 is a section on the line 4—4 of Fig. 3.

Fig. 5 is a perspective detail view, and

Fig. 6 is an elevational side view of a modification.

Referring to the several views of the drawing, the mechanical movement is incorporated in a fan, which comprises a base 10 having a bottom plate 11 from which rises a post 12 slotted at the upper end to provide upstanding lugs 13 and 14.

Between said lugs is received a depending member 15 having an outline to conform to the shape of the lugs and adapted to be held in place by a screw 16 provided at one protruding end with a wing nut 17.

The depending member 15 is formed integral with a bearing member 18 formed with a central vertical bore 19 to receive therein a depending shaft 20 secured to the casing 21 of an electric motor 22.

The shaft 20 is provided near its lower end with a circumferential groove 23 to partly receive therein the screw 16 to prevent withdrawal of the shaft therewith of the motor from the bearing member 18. The bore 19 has at its upper end a counterbore portion 25 to receive therein a bushing 26 which surrounds the shaft 20, and also forms a bearing surface for the motor casing 21.

The motor 22 does not form a part of the invention per se and may be made of any preferred or standard construction.

The motor shaft 27 carries at its rear end a worm 28 meshing with a worm wheel 29 fast on a hollow vertical shaft 30 which surrounds a vertical shaft 31 journaled in a top wall 32 and a bottom wall 33 of a reduced casing generally designated by 34 which is integral with a motor casing or may be made separate and secured to said motor casing.

It is within the scope of the invention to eliminate the additional casing 34 and to construct the motor casing in such a manner as to encase the various worms, worm wheels, and shafts necessary for producing the oscillating movement presently to be described.

The hollow shaft 30 is provided with a worm 35 meshing with a worm wheel 36 formed with an integral hollow hub 37 to be placed on a stud 38 secured to the end wall 39 of the casing 34.

Attention is called to the fact that the worm wheel 29 rotates about a vertical axis, whereas the worm wheel 36 rotates about a horizontal axis, so that it is possible to impart movement from the driving member 28 to a driven member in the same vertical center.

The worm wheel 36 is provided with a slanting bore 40 to receive therein a pin 41 projecting from a disk 42 which is received in the forked end of a cylindrical member 43 and is held therein for oscillation by a cross pin 44. The pivotal pin 44 carried by 43 is positioned at the point of intersection of imaginary continuations of the center lines of the bore 40 and the wheel 36, for reasons hereinafter fully disclosed.

The member 43 is formed integral with a stud 45 which is received in the vertical bore 46 of a solid shaft 47 oscillatably mounted on the casing of the motor 22, and has press-fit engagement therewith, so that the stud 45 and the shaft 47 are functionally integral.

The shaft 47 is provided with a flange 48 at its lower end, which supports a ring 49 formed integral with or having fixedly secured thereto a gear sector 50.

A set screw 51 having a conical inner end 52 extends through an aperture in the ring 49 and enters a conical depression in the shaft 47, so that upon screwing the threaded member 51 home the ring 49, the sector 50 and the shaft 47 constitute a rigid system.

The sector 50 meshes with teeth of a partial gear 53 which may be made integral with the bearing member 18 or made separate and secured thereto.

In the operation of the invention current enters the motor 22 through the leads, indicated generally at 54, causing rotation of the shaft 27 and of the fan 55 carried thereby. The rotation of shaft 27 results in the rotation of the wheel 36 which is directly connected thereto, through the speed-reducing gear train fully described above. As the wheel 36 rotates it carries the end of the pin 41 in a circular path, the pin being seated in the bore 40 in the wheel, and exerts a constant force on the pin which, at any given time, is directed tangentially of the circular orbit of the end of pin. As the opposite end of pin 41 is pivoted upon the part 43 of the shaft 47 upon an axis 44 which intercepts the axis of rotation of the wheel 36 it is apparent that all force components perpendicular to the axis 44 result only in the pivotal movement of the pin thereabout. All force components parallel to the axis 44, however, result in the rotation of the shaft 47, the actual movement of shaft 47 clearly being an oscillation as the direction of the force component exerted by wheel upon the pin which is parallel to the pin 44 is reversed during each 180 degrees of rotation of the wheel. The oscillation of the shaft 47 directly results in the oscillation of gear sector 50, which, through being intermeshed with the fixed gear sector 53, is prevented from free movement about the axis of shaft 47 and instead rolls around the periphery of sector 53 moving the shaft 47 and the entire motor with it. The direction of rotation of sector 50 reverses with shaft 47 thereby producing oscillation as desired.

Attention is called to the fact that by reason of the provision of the distance of the axis of the shaft from the vertical axis of the motor, a great amplitude of oscillation is provided for the motor, without minimizing the sizes of the engaging teeth of the sector 50 and of the gear 53, which motor in the instant case sweeps through an arc in excess of 90°. It is clear that the arc of rotation of the fan is determined by the ratios of the diameters of the gear sectors 50 and 53. It is one of the advantages of the invention that the arc of rotation can readily be controlled by the selection of these gears. The greater the ratio of the diameter of gear 50 to the diameter of gear 53, the greater is the arc of rotation. The converse is equally true.

If it is desired to operate the fan as a stationary fan without oscillation, then the set screw 51 is loosened so as to disconnect the shaft 47 from the ring 49 and the sector 50.

It is, of course, a matter of choice and arrangement to increase the amplitude of oscillation to any extent short of a complete rotation.

The provision of the screw 16 permits adjustment of the device to direct an air current horizontally or under any angle desired, it being necessary to adjust the motor casing under an angle and secure the motor in such adjusted position by the screw 16.

The modification shown in Fig. 6 constitutes a reversal of parts of the mechanical movement. In this instance, a motor 60 is secured by screws 61 to a ceiling or other overhead support so as to be held stationary. The sector and associated parts are the same as in the first described embodiment except that the shaft 20' carries a member 62 provided with a gear 63 meshing with the sector. It is evident that in operation the motor, being stationary, causes oscillation of the member 62.

The drawing discloses a preferred embodiment of the invention without, however, depicting all of the possible rearrangements and variations which may be made in order to obtain the objects herein stated. Thus the transmission of drive from the motor shaft to the sector may be changed and various other features may be altered to accomplish the same end as obtained by the present invention.

It is, therefore, not my intention of limiting myself to the details of construction and arrangement, as shown, but include all changes and alterations constituting departures within the scope of the invention.

I claim

1. A mechanical movement, including an oscillatory motor having a driven shaft, a supporting element underneath said motor relatively to which it may oscillate, and a train of power-transmitting elements having therein reversing means comprising a worm having a horizontal axis carried by said driven shaft, a worm wheel meshing with said worm, a second worm, a vertical shaft on which said worm wheel and said second worm are mounted, a second worm wheel disposed below said first-mentioned worm in mesh with said second worm and having a horizontal axis, and a cylindrical member connected to and adapted to be oscillated by said last-mentioned wheel by an eccentric lost motion connection for oscillation extending at an angle to said driven shaft and gear means connecting said member to said supporting element.

2. A mechanical movement, including an oscillatory motor having a driven shaft, a supporting element relatively to which said motor may oscillate, a fixed element secured to said supporting element, and a train of power-transmitting elements having therein reversing means comprising a worm having a horizontal axis, a worm wheel and a worm, a vertical shaft on which said worm wheel and said worm are mounted, a worm wheel disposed below said first-mentioned worm and having a horizontal axis, said last-named worm wheel having a slanting bore, and a cylindrical member engaging and adapted to be oscillated by said last-named wheel, said cylindrical member carrying a pin engaging said bore.

3. A mechanical movement, including an oscillatory motor having a driving shaft, a supporting element relatively to which said motor may oscillate, a fixed element secured to said supporting element, and a train of power-transmitting elements disposed between said driving shaft and said fixed element having therein an oscillatory cylindrical member, a vertical shaft fixed to said cylindrical member, a ring loosely mounted on said vertical shaft, means movable with said ring and engaging said driven element, and means for locking said ring to said vertical shaft.

4. In a mechanical movement, a support, a prime mover journaled in said support, a rotary driven member, means carried by said prime mover associated with said driven member to be oscillated thereby, said means including a lost motion connection extending at an angle to the major axis of said prime mover, and means on said support for imparting oscillation from said first-named means to said prime mover.

5. In a mechanical movement, a support, a prime mover journaled in said support, a rotary driven member, means carried by said prime mover associated with said driven member to be oscillated thereby, said means including a lost motion connection extending in a plane at an angle to the major axis of said prime mover, and means on said support for imparting increased oscillation from said first-named means to said prime mover.

6. In a mechanical movement, a motor having a rotating shaft, an element extending at an angle to said motor shaft, said motor and said element being mounted for relative oscillation, and means to produce relative oscillation between said motor and element, said means including a power-transmitting element driven by said motor shaft and rotating about an axis substantially perpendicular to the axis of oscillation and exerting force in a multiplicity of directions, a rotatable second shaft carried by said motor substantially parallel to the axis of oscillation, means interposed between said second shaft and said power-transmitting element transmitting force from said transmitting element to said second shaft perpendicular to said shaft only to alternately rotate same in opposite directions, and means connecting said second shaft to said element.

7. In a mechanical movement, a driving motor including a body and a rotating shaft, means supporting said motor for oscillation about an axis extending at an angle to said shaft, a second shaft carried by said body extended substantially parallel to the axis of said supporting means, a member connected to said motor shaft and rotating about an axis lying in an imaginary plane including said second shaft, an element pivoted to said second shaft upon an axis perpendicular to said plane, and connected to said member and receiving force therefrom in a multiplicity of directions, said pivotal connection permitting the loss of all force except that perpendicular to said plane, said element functioning to oscillate said second shaft, and means connecting said second shaft to said supporting means to cause said shaft to revolve thereabout.

8. In a mechanical movement, a prime mover including a body and a shaft, means supporting said prime mover for low speed oscillation about an axis perpendicular to said drive shaft, a member rotatable about an axis lying in a horizontal plane parallel to a horizontal plane through said shaft, a gear train connecting said member to said drive shaft and causing said member to rotate at reduced speed, a power-transmitting shaft carried by said body substantially perpendicularly to the axis of said member and extended to a point opposite said supporting means, a rigid element journaled eccentrically on said member and pivoted directly to said power-transmitting shaft, said element functioning to oscillate said power-transmitting shaft upon the rotation of said member, and cooperative gear sectors fixedly carried by said supporting means and by said power-transmitting shaft causing said shaft to move around said supporting means.

9. In a mechanical movement, a prime mover having a body, a drive shaft, a housing at one end of said body into which said shaft extends, a rotatable wheel in said housing, a gear train in said housing connecting said wheel to said drive shaft, an oscillatable shaft carried by said body and extended into said housing adjacent the face of said wheel, a rigid member journaled eccentrically on said wheel and pivoted on said oscillatable shaft upon an axis through the center of said shaft and through an imaginary extension of the center line of said wheel, said element functioning to oscillate said last mentioned shaft upon the rotation of said drive shaft, an element journaled to said body upon an axis substantially parallel to said oscillating shaft, a gear sector carried by said element, and a second gear sector on said oscillative shaft, said gear sectors adapted to cooperate to cause relative oscillation between said body and said element upon the rotation of the drive shaft and the consequent oscillation of said oscillatable shaft.

10. In a mechanical movement, a prime mover including a body and a drive shaft, an element, means oscillatably mounting said element relative to said body, and means to produce relative oscillation between said body and said element comprising a rotatable member driven by said shaft, an oscillatable shaft carried by said body parallel to the axis of said mounting means and extended perpendicular to and adjacent said rotatable member, a force-transmitting element eccentrically journaled to said member and pivotally connected to said oscillatable shaft, upon an axis perpendicular thereto, said element functioning to oscillate said shaft upon the rotation of said member, and cooperative gear sectors on said element and on said oscillating shaft to translate the oscillation of said shaft into relative oscillation between said body and said element.

11. The construction recited by the preceding claim characterized in that means are provided to render said oscillation-producing means inoperative comprising a rotatable connection between one of said gear sectors and the post on which it is mounted in combination with a manually operable lock which functions to eliminate rotation at said connection in one of its positions.

12. In a mechanical movement, a prime mover including a body and a shaft, means supporting said body for oscillation about an axis perpendicular to said drive shaft, an oscillatable shaft carried by said body parallel to the axis of oscillation and extended substantially from said drive shaft to a point spaced radially from said supporting means, a member rotatably mounted upon an axis perpendicular to said oscillatable shaft, means rotating said member upon the rotation of said shaft, a sloping bore eccentrically positioned on said member and facing said oscillatable shaft in all positions during the rotation of said member, a rigid element seated in said bore and pivoted to said oscillatable shaft upon an axis perpendicular thereto, said element functioning to oscillate said oscillatable shaft upon the rotation of said member, a gear sector carried by said shaft at a point spaced radially from said supporting means, a second gear sector carried by said supporting means in mesh with said first sector, said second gear sector rolling around said first sector in the operation of the device, the extent of said movement being determined by the ratios of the radii of the gear sectors.

LOUIS GREENBERG.